July 6, 1937. F. J. BARRETT, JR Re. 20,434

SANCTUARY LAMP AND CANDLE THEREFOR

Original Filed June 26, 1933

Inventor:
Francis J. Barrett Jr.
By
Williams, Bradbury, McCaleb & Hinkle.
Attys.

Patented July 6, 1937

Re. 20,434

UNITED STATES PATENT OFFICE 20,434

SANCTUARY LAMP AND CANDLE THEREFOR

Francis J. Barrett, Jr., Chicago, Ill., assignor to Candy & Company, Inc., Chicago, Ill., a corporation of Illinois Original No. 1,975,496, dated October 2, 1934, Serial No. 677,547, June 26, 1933. Application for reissue June 29, 1936, Serial No. 38,035

11 Claims. (Cl. 67—21)

My invention relates to a sanctuary lamp—although its application is not necessarily limited to such use—and it embraces invention in the candle unit and the fixture for burning the candle. As applied to church or other religious uses it is especially concerned with the type of candle calculated to burn continuously for a period of several days, and to this end many of the features of my invention are concerned with the control and limitation of the air supply to the flame whereby the rate of burning and consumption of the candle is limited.

Another object of my invention is to so control the flame as to render the size of the flame and the intensity of the light given off uniform despite variations in external conditions such as temperature.

A further object of my invention is to retain for a candle type of lamp a uniform visibility of the flame, especially as against the tendency to impair the translucency or transparency of the jacketing members by wax deposits, condensation, etc., which is often aggravated when the room is cold.

A still further object of my invention is the provision of a candle and fixture therefor so constructed and arranged that the candle can be burned down and replaced by another candle conveniently and without soiling the fixture, whereby it is unnecessary in changing to a new candle to clean the fixture.

The foregoing together with further objects, features, and advantages of my invention are set forth in the following description of the specific embodiment thereof and illustrated in the accompanying drawing, wherein.

The candle itself 10 may be of the conventional type, structure and composition, usually beeswax. The edge of the upper end is embraced by a ferrule of fiber or thin metal. A similar ferrule 12 embraces the lower corners, except that it incorporates a flat bottom, making it a cap. The candle, together with the ferrules 11 and 12, is tightly jacketed in a cylindrical transparent film 13 of amorphous cellulose, for example, such as is currently sold by the DuPont Cellophane Co. Inc., of Wilmington, Delaware, under the trademark name Cellophane. Preferably this film is extruded in cylindrical form and, while still undried, fitted over the candle to which the ferrules 11 and 12 have previously been applied. (For this purpose the pre-formed cylindrical films may conveniently be shipped and stored in liquid-filled drums to prevent their premature drying and shrinkage.) Upon drying the film 13 contracts upon the ferrules 11 and 12 and also snugly fits the intervening body of the candle. The upper and lower edges of the transparent film are drawn around the upper and lower edges of the respective ferrules insofar as conveniently practicable.

The transparent film can as an alternative be applied by rolling a flat undried sheet around the assembled candle and ferrules, or a dried film can be used, although the latter would not give so tight and satisfactory a fit. I also contemplate that the contracted film may be formed on the candle by dipping or coating.

Figure 2:
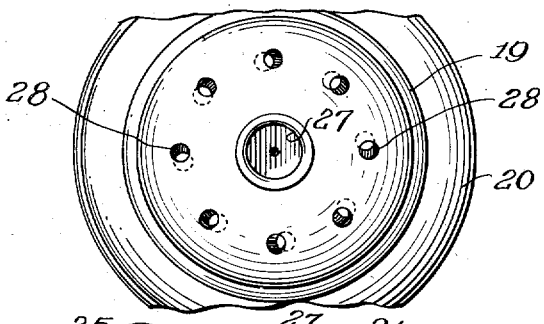
Fig. 2 is a plan view thereof.
Figure 1:
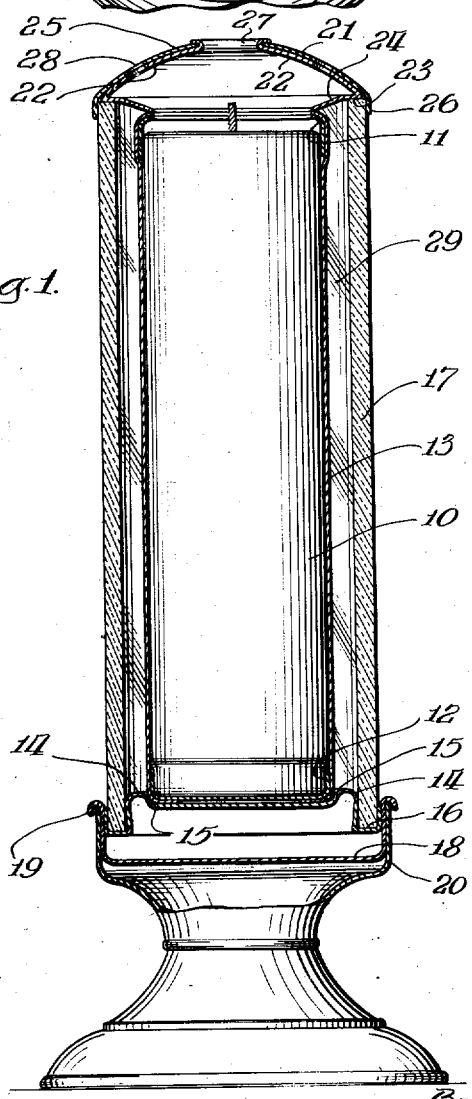
Fig. 1 is a candle burning sanctuary lamp broken into longitudinal cross section.
Figure 3:
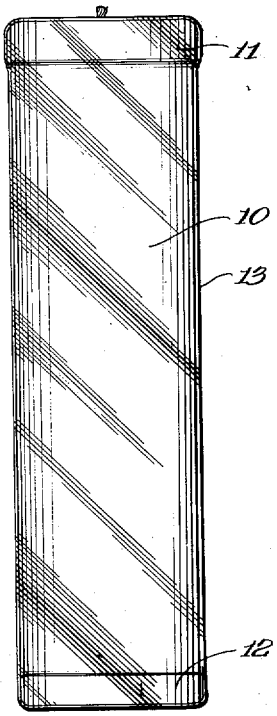
Fig. 3 is a side elevation of the replacement candle unit itself.

The assembled candle, upper ferrule 11, lower ferrule or cap 12 and transparent film 13, as thus described and as illustrated in Fig. 3, constitute a candle unit which I contemplate will be supplied as a unit for replacement in the fixture, which I shall presently describe. Because the elements of the candle unit, other than the candle itself, are relatively inexpensive, the entire assembly, after the candle has been burned, may be discarded and the replacement units supplied at but little more than the price of the candle itself.

The bottom of the candle unit of Fig. 3 rests upon an adaptor 14 which presents a central depression 15 for the reception of the lower end of the candle unit. Radially beyond the central depression 15 is an annular trough 16 for the reception of the lower end of a glass tube 17. For the sake of appearance and a somewhat more secure fit of the adaptor in the base, the adaptor may carry a cup shaped bottom member 18 united at its upper edge to the outer wall of the trough 16. The adaptor is then turned out and over into an ornamental bead 19. The adaptor 14, including its cup shaped bottom piece 18, presents a cylindrical surface which fits into a socket in the upper end of a support 20 which, like the adaptor, may be formed of spun brass. The support 20 may be a part of a pendant fixture or, as here illustrated, may have a broad base for setting the lamp on a flat surface.

A draft regulating cap 21 is set upon the upper end of the glass tube 17. It may conveniently be made in two pieces formed from sheet stock. The field of the inner member 22 may be in the form of the surface of a spherical segment, with its lower edge bent inwardly at 23 to form a shoulder resting upon the upper edge of the tube and extending further inwardly and somewhat downwardly to the upper inner edge of the upper ferrule 11, as indicated at 24. The outer member 25 nests with the under member 22, and at its lower edge has a downward flange 26 which embraces the outer periphery of the upper edge of the glass tube 17. Both members 22 and 25 have a central aperture 27 and the under member 22 is spun upwardly and around the central opening of the outer member 25 rotatably to secure the two members together. The two members have registering air supply holes 28, but by rotating the outer member the holes may be adjustably turned out of registry for adjusting the air supply. The central opening 27 provides an outlet for the hot gaseous products of combustion of the candle flame. The draft created by their upward flow through the central opening 27 draws outside air down through the openings 28 and this incoming cold air is deflected by the flange 24 so that instead of going down into the annular space 29 between the film 13 and the glass tube 17, it is deflected to the interior of the film 13 and down to the base of the flame. The adjustment of the air supply openings 28 will serve within reasonable limits to control the magnitude of the flame and consequently the light intensity of the flame and the duration of the burning of the candle.

Gaseous products of combustion passing upwardly from the flame come against the inside surface of the cap 21 and pass out through the central opening 27 thereby imparting heat to the cap. This heat is conducted radially outwardly and in turn transferred to the incoming air through the apertures 28. In this way, to a considerable extent, the temperature of the incoming air which passes down into contact with the top surface of the candle is maintained uniform even though the temperature of the surrounding air may vary considerably. This variation is not only seasonal, but, especially in the winter, may occur within a few hours as the room may be heated for occupancy or allowed to grow cold.

If the incoming air which passes along the wall of the film and across the top of the candle were not thus preheated, it would tend to congeal the material of the candle with the result that opaque deposits would be formed on the surface of the cylindrical film, the top surface of the candle would not melt all of the way to the edges leaving further deposits on the tube, and as the amount of melted wax material available at any moment would be less, there would be a slowing up of the rate of combustion of the candle and a lessening of the brilliancy of the flame. All of these varying factors would represent a loss of uniformity. Also, this freedom from congealed deposits renders the cylindrical film 13 fully transparent, and in consequence there is no impairment of the brilliancy of the candle light. The heat of the combustion in the flame is sufficient to maintain the interior of the transparent film at a temperature where the material of the candle will not solidify into an objectionable opaque film or deposit.

The annular space 29 between the transparent film and the glass tube, being substantially a dead air space, acts as an insulator to shield the transparent film 13 from the outside cold even though the thin film 13 itself has but little insulating value. At the same time the inner wall of the glass tube 17 is protected against the condensation and congealing of any matter upon its inner wall which would lessen the transparency.

As the candle itself burns down, the cylindrical film 13 does not collapse, but remains upstanding and retains its form, whereby the flame gradually sinks lower and lower within the tubular film. Because the upper edge of the film is contracted tightly on to the upper ferrule 11, the ferrule does not fall as the candle burns, but remains at the top of the cylindrical film to retain its rotundity and to preserve something of a seal for the flange 24 of the cap.

The burning of the candle, all of the particles of the material of the candle—whether melted or not—and all particles of the wick including burnt portions, and also any moisture resulting from the combustion which may have condensed within the lamp, are all confined within the cylindrical film 13 and its bottom cap. The cylindrical film, aided by the reinforcement provided by the upper ferrule 11 on to which it is shrunk, has sufficient rigidity, owing to its tubular form, to maintain an erect position centered within the glass tube 17. Although the cellulose of which the cylindrical film 13 is made is inflammable, I am enabled to use it relatively close to the candle flame without danger of its burning. This is because the film never gets close enough to the flame or to the heat generated by the flame. The body of the candle itself will always space the wick, which determines the position of the flame, centrally of the film at the height of the flame. The introduction of the cooler air through the openings 28 insures that air travels down along the inside of and next to the cylindrical film and the heat generated by the film travels upwardly along the center of the tube. When the candle has burned entirely down to its bottom, the bottom of the film 13 is protected from the flame by the bottom ferrule or cap 12 which is not inflammable.

When the candle has burned out or is about to burn out and it is desired to substitute another, the glass tube 17 is grasped in the hand and lifted up together with the cap 21. The botom end of the glass tube preferably having a rather snug fit in the annular trough 16, the adaptor 14 may come with the glass tube, in which event the adaptor is pulled off and the empty candle shell comprising the ferrules 11 and 12 and the transparent cylindrical film 13, is removed and discarded together with all of the remaining portions of the candle and its wick. It is unnecessary to clean any of the parts because no drippings from the candle or other matter have been permitted to drop out of the candle shell into the fixture. Another candle unit, such as shown in Fig. 3, is easily and quickly substituted and the lamp reassembled. This operation does not even require the extinguishment of the candle which is being removed until after the new candle has been inserted and lit, thus making possible a complete continuity of candle light in those instances where it is desired. Even after the candle shell has been removed, if there be some candle left in the bottom of it, the flame will be protected by the transparent sleeve, even though removed from the fixture.

The cylindrical film 13 with its associated upper and lower ferrules 11 and 12, in addition to their functions in the burning of the candle, serve as a peculiarly desirable packaging for the candle itself. The transparency of the film permits a ready inspection of the candle. The ferrules protect the edges of the candle against crushing or chipping. If, as is shown, the top edge of the upper ferrule 11 be spaced upwardly somewhat from the top of the candle when packed, the space affords a protection for the wick whereby in close packing the wick is guarded against being pressed into the body of the candle or otherwise disturbed. The cellulose film, being waxproof, guards against marking of objects with which the candle may come in contact before use, and this guarding from contact with the wax is particularly desirable in hot weather. While the film is preferably transparent—but at least translucent—the film is flexible and not readily fractured by dropping or impact with other objects.

The transparent cylindrical film 13 of the candle unit which jackets the candle may be either clear or colored and combined with either a clear or colored glass tube 17. While I have illustrated and described and prefer to employ the inner transparent cylinder as an integral part of a candle unit, I contemplate that it may be incorporated as a part of the fixture with the candle insertable into it, or the inner transparent cylinder may be supplied apart from the candle and the tube assembled as a unit by the user.

I also contemplate that other variations and changes may be made in my invention, as herein set forth without departing from the scope or spirit thereof.

Having thus described my invention, what I claim is:

1. A candle enveloped in a close fitting transparent wax proof film of cellulose material, a stiffening ring about the top edge of the candle to which the upper edge of the film is secured to position the film away from the candle flame as the candle burns down, and a bottom closure for the candle between it and the bottom of the film forming an oil proof base over the entire bottom of the candle.

2. A sanctuary lamp comprising a transparent tube, a base therefor, and a candle unit also mounted on and supported by the base and comprising a candle of waxlike material, a transparent film enveloping the candle, a flame proof cap embracing the bottom of the candle and between the candle and the lower end of the film, and a ring at the upper end of the candle secured to the upper end of the film for reinforcing it and preserving its contour whereby the film remains upstanding and out of contact with the flame as the candle burns down, and a cap mounted at the upper end of the tube and having a central discharge opening for the products of combustion of the flame and air inlet openings radially therebeyond.

3. A sanctuary lamp comprising a transparent tube, a base therefore, and a candle unit also mounted on and supported by the base and comprising a candle of waxlike material, a transparent film enveloping the candle, a flame proof cap embracing the bottom of the candle and between the candle and the lower end of the film, and a ring at the upper end of the candle secured to the upper end of the film for reinforcing it and preserving its contour whereby the film remains upstanding and out of contact with the flame as the candle burns down, and a cap mounted at the upper end of the tube and having a central discharge opening for the products of combustion of the flame and air inlet openings radially therebeyond, the lamp including means extending from the film to the tube substantially to close the space therebetween.

4. A sanctuary lamp comprising a glass tube adapted to receive a candle, and a cap adapted to be received on the top of the tube, the cap comprising superposed upper and lower members joined for relative rotation about the axis of the tube and having a central discharge opening for the products of combustion of the flame and, radially therebeyond, registered openings for admitting air, the rotation of one member relative to the other adjusting the portage of the registering openings.

5. A candle unit comprising a non-tapering cylindrical wax-like candle body of a composition which contracts upon solidifying and of a height several times its diameter, a central wick in the body, a symmetrical cylindrical film of smooth, unwrinkled transparent amorphous cellulose material snugly jacketing the body and extending throughout the height thereof, the film being constructed and arranged to remain standing in its cylindrical form as, and after, the candle burns down, and a bottom cap for the body within the lower edge of the film, the cap being formed of wax-proof flame-resisting material.

6. A sanctuary lamp comprising a candle unit comprising a non-tapering cylindrical wax-like candle body of a height several times its diameter, a central wick in the body, and a cylindrical film of transparent amorphous cellulosic material snugly jacketing the body and extending throughout the height thereof, the film being constructed and arranged to remain standing in its cylindrical form as, and after, the candle burns down, and a transparent outer tubular shell surrounding the candle unit and radially spaced therefrom to form an annular space, and means for substantially closing the top of said air space.

7. The method of forming and packaging a candle unit which consists in inserting a cylindrical non-tapering candle into a cylindrical non-tapering tube of transparent amorphous cellulose of a height equal to the height of the candle, before the shell has dried, and shrinking the shell tightly onto the periphery of the candle as a transparent jacket therefor as a result of the drying of the shell.

8. The combination with a candle, of a packaging film of flexible translucent sheet material snugly embracing the candle from top to bottom, a closure for the bottom end of the film, the film being constructed and arranged to remain upstanding and self-supporting as the candle burns down, and a separate reinforcing ring of stiffer material within the upper end of the film and embraced thereby.

9. A candle unit comprising an elongated cylindrical body of wax-like material which contracts upon solidifying, a central wick therein, and a symmetrical packaging jacket comprising a cylinder of smooth, unwrinkled translucent amorphous cellulosic sheet material snugly embracing the body and extending from adjacent the bottom to the top thereof, the jacket being constructed and arranged to remain upstanding in its cylindrical form as and after the candle burns down.

10. A candle unit comprising an elongated cylindrical body of wax-like material, a central wick therein, and a packaging jacket comprising a bottom closure portion and, there-above, a symmetrical cylindrical portion of smooth, unwrinkled transparent amorphous cellulosic sheet material snugly jacketing the cylindrical periphery of the body and extending from the bottom closure portion to the top of the body, the jacket being constructed and arranged to remain upstanding and self-supporting in its cylindrical form as and after the candle burns down, the bottom closure portion and the cylindrical portion being joined together with a wax-tight seal whereby all melted wax and other residuum of the burning or burned candle are retained within the jacket.

11. A candle unit comprising an elongated cylindrical body of wax-like material which contracts upon cooling, a central wick therein, and a packaging jacket comprising a cylinder of translucent amorphous cellulose sheet material contracted upon and tightly embracing the body and extending from adjacent the bottom to the top thereof, the jacket being constructed and arranged to remain upstanding in its cylindrical form as and after the candle burns down.

FRANCIS J. BARRETT, JR.